US006493869B1

(12) United States Patent
Kwiatkowski et al.

(10) Patent No.: US 6,493,869 B1
(45) Date of Patent: Dec. 10, 2002

(54) INHERITING CODE IN A TRANSFORMATIONAL PROGRAMMING SYSTEM

(75) Inventors: Paul Kwiatkowski, Seattle, WA (US); David Richter, Seattle, WA (US); M. Paramasivam, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/322,399

(22) Filed: May 28, 1999

(51) Int. Cl.$^7$ ................................................ G06F 9/44
(52) U.S. Cl. ...................................................... 717/106
(58) Field of Search .................... 717/1, 2, 106–109, 717/100–105; 706/61; 709/204, 218, 227, 231, 232; 345/763, 700

(56) References Cited

U.S. PATENT DOCUMENTS

| | | | |
|---|---|---|---|
| 5,018,075 A | | 5/1991 | Ryan et al. |
| 5,428,554 A | | 6/1995 | Laskoski |
| 5,673,369 A | | 9/1997 | Kim |
| 5,790,863 A | | 8/1998 | Simonyi ..................... 395/707 |
| 5,815,711 A | * | 9/1998 | Sakamoto et al. ............. 717/1 |
| 5,828,883 A | | 10/1998 | Hall |
| 5,870,564 A | | 2/1999 | Jensen et al. |
| 5,911,072 A | | 6/1999 | Simonyi ..................... 395/701 |
| 5,974,257 A | * | 10/1999 | Austin ......................... 717/11 |
| 6,006,233 A | | 12/1999 | Schultz |
| 6,237,136 B1 | * | 5/2001 | Sadahiro ........................ 717/2 |
| 6,253,369 B1 | * | 6/2001 | Cloud et al. ................... 717/5 |
| 6,272,673 B1 | * | 8/2001 | Dale et al. ..................... 717/1 |

OTHER PUBLICATIONS

Poswig et al. Interactive Animation of Visual Program Execution. IEEE. 1993. pp. 180–187.*
Alberto Martelli et al., "Optimizing Decision Trees Through Heuristically Guided Search," ACM Communications, Dec. 1978, vol. 21, No. 12, pp. 1025–1039.
Glenn Ammons et al., "Improving Data—Flow Analysis with Path Profiles," ACM Apr. 1998, pp. 72–84.
R. Bergamaschi et al., "Data Path Synthesis Using Path Analysis," ACM, Jul. 1991, pp. 591–596.
W. Sung et al., "Memory Efficient Software Synthesis from Dataflow Graph," IEEE, May 1998, pp. 137–142.
Carl Beckmann et al., Microarchitecture Support for Dynamic Scheduling of Acyclic Task Graphs, IEEE, Sep. 1992, pp. 140–148.
David F. Bacon et al., "Compiler Transformations for High Performance Computing," ACM Computing Surveys vol. 26, No. 4, Dec. 1994, pp. 345–419.
B. Ryder et al., "Elimination Algorithms for Data Flow Analysis," ACM Computing Surveys, vol. 18, No. 3, Sep. 1986, pp. 277–316.
David Kinloch et al., "Understanding C Programs Using the Combined C Graph Representation," IEEE, Aug. 1994, pp. 172–180.
David Grove et al., "Call Graph Construction in Object–Oriented Languages," ACM, Aprl. 1997, pp. 108–124.
Evelyn Duesterwald, "Demand–driven Computation of Interprocedural Data Flow," ACM, Jan. 1995, pp. 37–48.
Alfred V. Aho et al., "Compilers Principles, Techniques, and Tools," Sep. 1985, Chapters 1–5.
David P. Olshefski et al., "A Prototype System For Static and Dynamic Program Understanding," IEEE, Mar. 1993, pp. 93–106.
Ben Shneiderman, "Designing the User Interface," Third Edition, Jul. 23, 1997, p. 12.
"6.5.1 Fundamental Definitions", 3 pages, dated May 11, 1999.

* cited by examiner

*Primary Examiner*—Gregory Morse
*Assistant Examiner*—Wei Zhen
(74) *Attorney, Agent, or Firm*—Lee & Hayes, PLLC

(57) ABSTRACT

A transformation programming system allows code to be inherited. A question and answer methodology is used among question handlers corresponding to nodes of a graph representing the program being transformed. A question handler can inherit code from another question handler by submitting a question requesting the code.

40 Claims, 8 Drawing Sheets

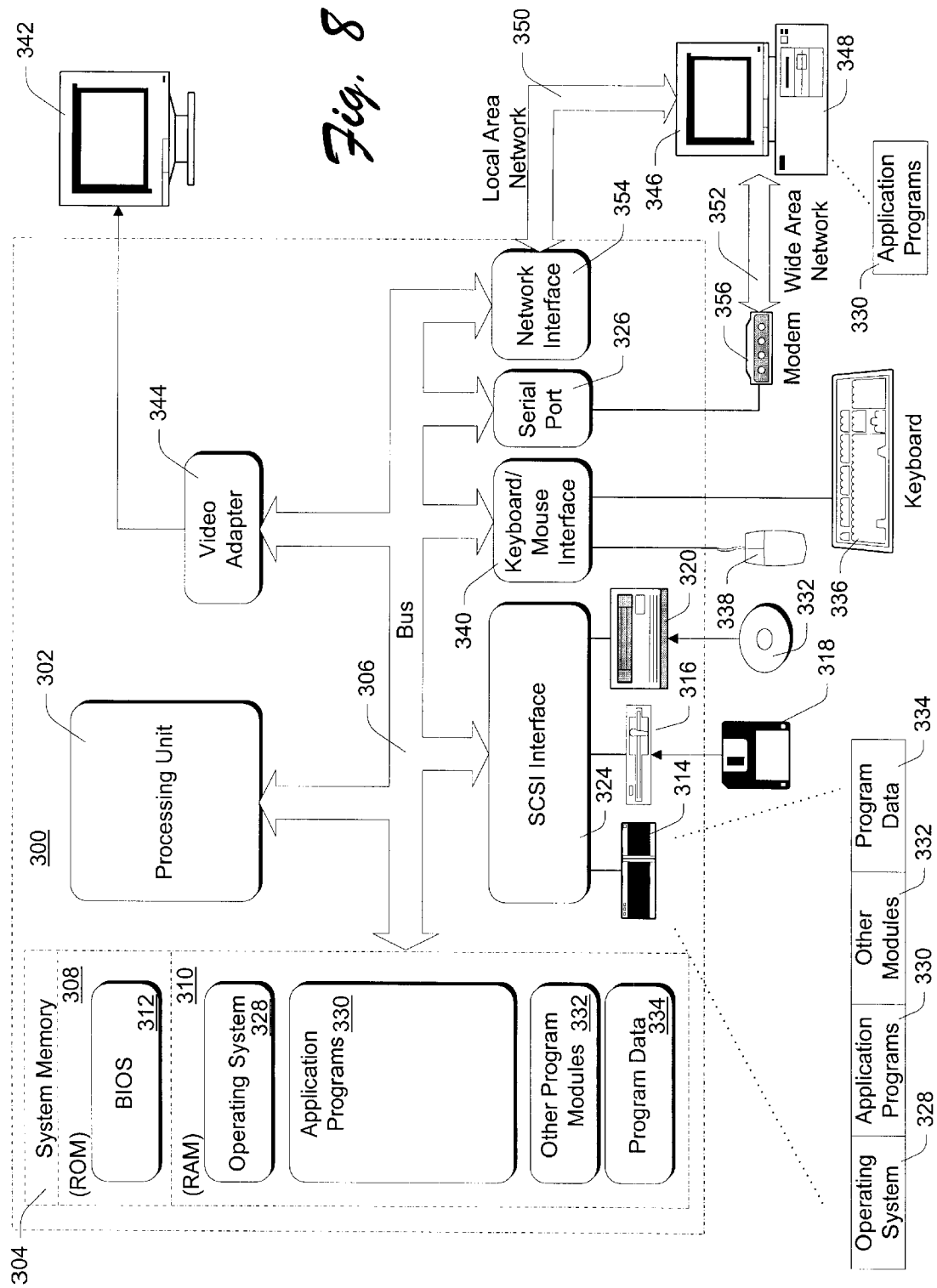

INHERITING CODE IN A TRANSFORMATIONAL PROGRAMMING SYSTEM

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to compilers, and more particularly to a transformational programming system in which code can be inherited.

BACKGROUND

As computer technology has advanced, computer programs have become correspondingly complex to the point where it is very difficult for a programmer to write an application program in the machine language of the computer. Thus, most programs are written in a high-level language that is easier for the programmer to work with and then converted by a compiler into the machine language of the computer.

A co-pending application titled "Extensible Compiler Architecture", Ser. No. 09/322,646, filed concurrently herewith, describes an extensible compiler architecture in which source code received by the compiler is represented as a graph having multiple nodes and interconnecting links. The compiler associates one or more question handlers with each node and uses a reduction engine to pass questions and answers among the question handlers. This question and answer methodology is used to transform the source code in graph form into another language.

The compiler also provides the code that describes the behavior of each of the question handlers. However, given the large number of nodes that can exist in a typical graph, having the compiler designer(s) separately write code for each question handler associated with each node can quickly become overburdening. Furthermore, given that the code for different question handlers may be very similar, if not the same, it would be beneficial to provide a way to avoid having to write the same code over and over for different question handlers.

The invention described below addresses these disadvantages, providing a transformational programming system that allows code to be inherited.

SUMMARY

A transformational programming system is described herein that allows code to be inherited. A question and answer methodology is used among question handlers corresponding to nodes of a graph representing the program being transformed. A question handler can inherit code from another question handler by submitting a question requesting the code.

According to one aspect of the invention, when a question handler corresponding to a node receives a question, the question handler submits another question to another question handler corresponding to another node. This other question is a request for a set of instructions to execute in order to respond to the question it received. Eventually, the question handler will receive a response to this other question, the response being the set of instructions to execute in order to respond to the question it received.

According to another aspect of the invention, communication between question handlers is carried out via a reduction engine. The reduction engine also maintains a record of questions that are asked as well as responses given. When a question is received from a question handler requesting a set of instructions to execute, the reduction engine checks whether it has already answered the same question for another question handler. If it has already answered the same question, then the reduction engine provides the set of instructions from the record it maintains rather than submitting the question to another of the question handlers.

According to another aspect of the invention, a first question handler that receives a request from a second question handler for a set of instructions to execute may not know itself what set of instructions the second question handler should execute. Rather, the first question handler submits a request to a third question handler corresponding to yet another node in the graph, requesting a set of instructions for the second question handler to execute. This chain of questioning can continue through multiple additional question handlers until eventually a question is submitted to a question handler that knows the set of instructions the second question handler should execute. A response including this set of instructions is then passed back down through the chain of question handlers, eventually reaching the second question handler.

BRIEF DESCRIPTION OF THE DRAWINGS

The present invention is illustrated by way of example and not limitation in the figures of the accompanying drawings. The same numbers are used throughout the figures to reference like components and/or features.

FIG. 8 shows a general example of a computer that can be used to run a compiler in accordance with one embodiment of the invention.

DETAILED DESCRIPTION

The invention is described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. In a distributed computer environment, program modules may be located in both local and remote memory storage devices.

Architecture

Figure 1:
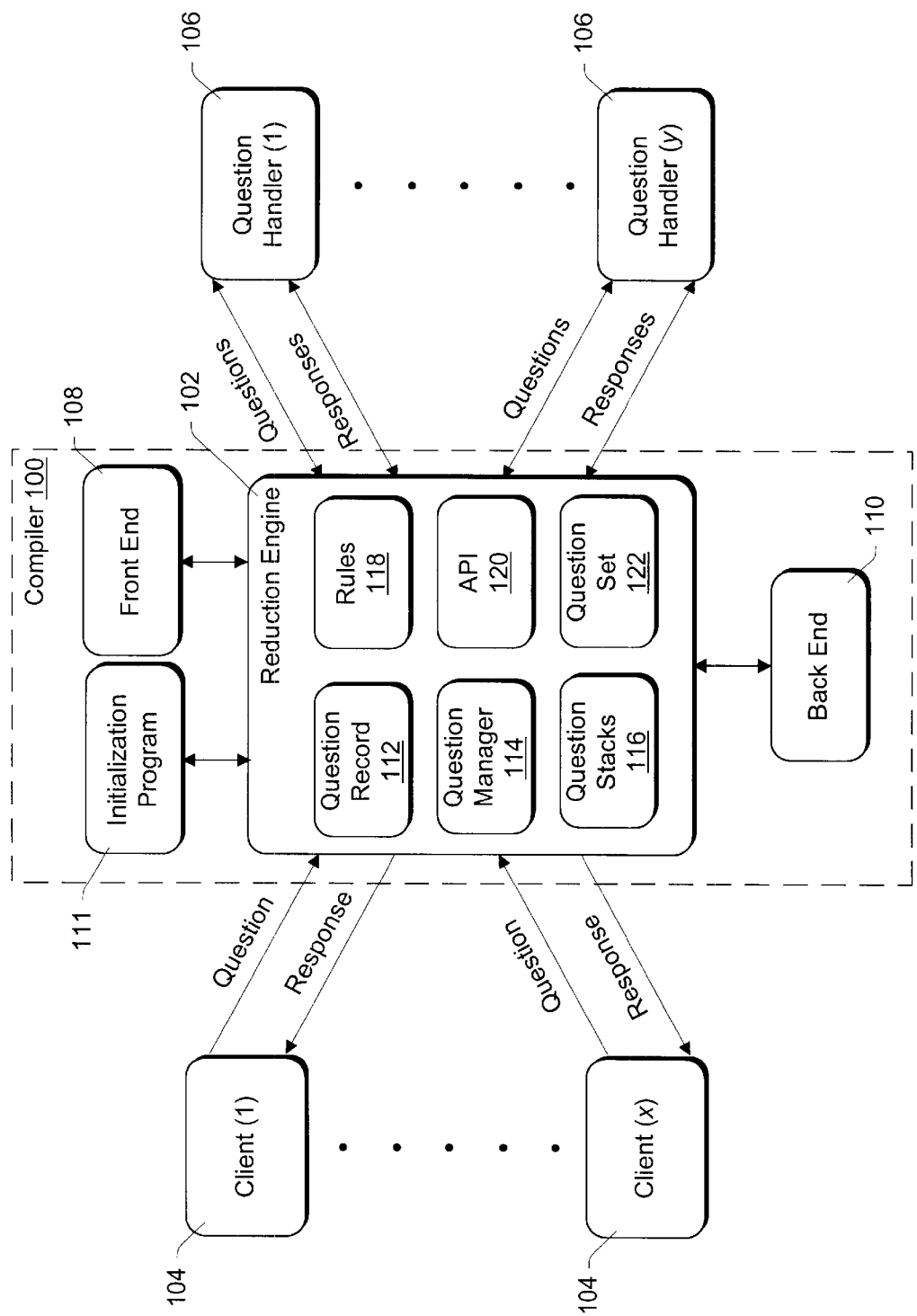
FIG. 1 illustrates an exemplary compiler architecture in accordance with the invention.

FIG. 1 illustrates an exemplary compiler architecture in accordance with the invention. A compiler 100 includes a reduction engine 102 that communicates with one or more clients 104 and one or more question handlers 106. Reduction engine 102 receives questions (or "requests") from both clients 104 and question handlers 106. Additionally, reduction engine 102 can dispatch questions (or "requests") to and receive responses (or "answers") from question handlers 106, and can also provide these responses (or "answers") to clients 104.

Compiler 100 also includes a front end 108 and a back end 110. Front end 108 provides various pre-processing functions, if necessary, to convert received source code into a graph or tree representing the program. The graph has multiple nodes, each of which includes identifiers of links to other nodes and can include tagged blocks of binary data, such as constant values or strings, that can be read from and written to. In the illustrated example, reduction engine 102 generates, based on the graph representing the program, code that is in a lower-level language than the graph, referred to as an intermediary language (IL). Once generated, the intermediary language is provided to back end 110 which operates in a conventional manner to convert the intermediary language to machine executable code. Examples of such intermediary languages include C++ code source, Java bytecode, etc. The conversion of the intermediary language, such as one of the previously listed examples, into machine executable code is well-known to those skilled in the art and thus will not be discussed further except as it pertains to the invention. Alternatively, reduction engine 102 may generate machine executable code directly without the need for back end 110.

When a source program is received, the proper question handler(s) are associated with each node of the graph. An initialization program 111 is invoked to associate question handler(s) with nodes of the graph by generating a data structure (e.g., a hash table) that identifies which question handlers are associated with which nodes of the graph. Alternatively, each node may include identifiers of which question handlers it is associated with. In the illustrated example, initialization program 111 is a separate dynamic link library (DLL). Alternatively, initialization program 111 could be part of front end 108 or part of reduction engine 102. Initialization program 111 includes a mapping of node identifiers to a set of one or more question handlers that are associated with that node identifier. For example, initialization program 111 may include a mapping of four different question handlers that are associated with any "if" node.

Clients 104 are components separate from reduction engine 102 that can submit queries to reduction engine 102 regarding an application program. Examples of clients 104 include a reduction client that allows a user to request that the program (or portion of the program) be compiled, an editor client that assists a user in editing the application program, a debugger client that assists a client in debugging the application program, etc. Examples of questions that a client can ask include: "What is your executable?", "What arguments should we prompt for in this context?", "How should the result of this expression be displayed in the debugger?", "What is the type of this expression?", "Is the value of this expression determinable at compile-time, and if so, what is it?".

Reduction engine 102 includes a question record 112, question manager 114, question stacks 116, rules 118, an application programming interface (API) 120, and a question set 122. Although illustrated as separate components, it is to be appreciated that any one or more of the components 112, 114, 116, 118, and 120 can be combined together. Question record 112 is a record in which information regarding questions asked and their responses is stored. Question manager 114 manages the scheduling of questions, determining which questions are dispatched to question handlers 106 when, as well as the forwarding of responses to the question handlers 106 and clients 104. Question stacks 116 maintain parameters and other information regarding questions that have been dispatched by reduction engine 102 but for which responses have not yet been received, and questions that are blocked from being dispatched. Rules 118 are rules (if any) that are to be followed by question manager 114 in scheduling questions. API 120 provides a programming interface for clients 104 and question handlers 106 to submit questions to reduction engine 102. API 120 also provides a programming interface for question handlers 106 to examine and modify the node corresponding to the question reduction engine 102 dispatched to them. Set 122 stores questions that have been received by reduction engine 102 but not yet dispatched to a question handler 106.

Based on a question received from a client 104, question manager 114 dispatches a series of questions to question handlers 106. Additional questions can then be submitted to reduction engine 102 by question handlers 106, which in turn are dispatched to other question handlers 106 by question manager 114 as appropriate. Eventually, all questions necessary to respond to the client 104 and dispatched by question manager 114 to question handlers 106 are answered, at which point reduction engine 102 can respond to the question provided by the client 104. As discussed in more detail below, each question handler 106 is associated with or "corresponds to" at least one node of the graph representing the program.

In addition to receiving questions from, dispatching questions to, and providing responses to question handlers 106, reduction engine 102 also keeps track of various information regarding these questions in question record 112. Such information can include an identifier of which question handler submitted the question, what question was asked, what question handler the question was sent to, what parameters the question had, what binary information on the node was accessed, what the answer to the question was, what questions the handler for the question submitted, and what outgoing links of the node the handler examined to answer the question. Question record 112 may contain a complete record of all questions asked, or a conservative approximation to a complete record, that is sufficient for the purposes of "roll back" as described below. If an approximate record is kept, it is conservative in the sense that there are no times that an implementation using an approximate record would not roll back and an otherwise equivalent implementation using a complete record would.

The responses to questions are also maintained in record 112. Maintaining record 112 helps to ensure that proper responses are given to a question. By way of example, a first question handler may ask for information on each of the children of the node it corresponds to, and another question handler may subsequently add another child to that node. Reduction engine 102, by maintaining a record of the first question handler in record 112, can detect that the response it gave is potentially no longer accurate and can "roll back" the effects of the first question handler and re-dispatch its question.

Improper responses can be detected by comparing additions to the graph to previously provided responses maintained in record 112. If a new link or new binary information is added to a node, then all questions previously responded to on this node are checked to verify that their answers remain the same. Any question handler whose answer may change (e.g., a link it looked for is added, binary information it read from the node is written to, etc.) is rolled back (i.e., any additions it made to the graph are removed and any questions it asked are "unasked"). The question is then re-dispatched and the answer compared to the answer received before. If any answer changes, then the compiler "rolls back" any question handlers which were clients of this one (and removes any additions they made to the graph) to re-dispatch them, as discussed in more detail below. Additionally, improper responses can be detected and the compilation process rolled back if the answer to the question is subsequently "influenced" (the use of "influence" is discussed in more detail below).

Alternatively, rather than unconditionally rolling back the question, reduction engine 102 may run the question again and check whether it returns the same answer and whether it wants to ask the same questions and make the same additions to the graph. If the question handler will be asking the same questions, making the same additions to the graph and returning the same answer then it is not necessary to roll back the question handler. In one implementation, if the question handler will be asking a subset of the same questions, and/or making a subset of the same additions, then it is necessary to redispatch the question handler and roll back those questions it no longer asks and those additions it no longer makes, but those questions and additions that did not change would not need to be rolled back and then re-asked/re-added.

Additionally, by maintaining or "caching" such information regarding questions, reduction engine 102 can respond more quickly to subsequent client questions. For example, if a first client (or question handler) asks a question and if a second client (or question handler) subsequently asks the same question, reduction engine 102 can use the responses it has stored in record 112 rather than resubmitting the questions to the question handlers in the graph.

Reduction engine 102 maintains a set 122 into which questions are placed as they are received. Different scheduling algorithms can be used by question manager 114 to determine what order questions are drawn from the set 122 in, such as a breadth-first walk through all orderings, a random reordering of the questions that are causing rollbacks, etc. Additionally, priority may be given to certain questions when the question handlers that submitted the questions are "waiting" and can progress no further in their execution until the answer is provided. Furthermore, one of rules 118 (discussed in more detail below) may block a question. If a question is so blocked, question manager 114 repeatedly checks (at regular or irregular intervals) whether the rule 118 causing the blocking has been satisfied, at which point the blocked question can be dispatched to the appropriate question handler 106.

When question manager 114 determines that a particular question from set 122 is to be dispatched to a question handler 106, question manager 114 uses one of stacks 116 to push procedure call arguments onto, for local storage allocation, etc., and uses an additional data storage structure associated with the stack 116 to maintain information regarding the question (e.g., identifier of the question, the question handler that asked the question, any parameters for the question, etc.) until a response is received and returned to the question handler that submitted the question. A different stack may be used for each question, or alternatively a stack may be used for multiple questions. According to one implementation, a new stack is used each time a question is "blocked" from proceeding any further due to a rule 118 causing that question to wait for a particular event (such as a new link to be added to the graph, as discussed in more detail below). A stack is then discarded when the last question handler on it runs to completion or is "unasked" due to a rollback. Alternatively, each question handler is given its own stack, which is discarded when that question handler runs to completion or is "unasked" due to a rollback.

Situations can arise where a response is provided to a question handler 106 that is no longer accurate. By way of example, a question handler 106 corresponding to an "if" node may query whether it has an "else" node linked to it. At the time the question is submitted, there may be no such "else" link, and a response given to question handler 106 indicating such. However, an "else" link may be added later, thereby making the previous supplied response incorrect.

Reduction engine 102 resolves such problems by maintaining a record of what questions are asked by question handlers, as well as possibly the order in which questions are submitted to question handlers 106 and also possibly maintaining a record of the order in which questions are received from question handlers 106. When the reduction engine 102 discovers that a previous response by the reduction engine 102 to a question handler 106 was incorrect, reduction engine 102 "rolls back", or undoes, all work based on that incorrect response. The reduction engine 102 may roll back more than the minimally necessary amount of work in an implementation dependent manner. All question submissions not undone by the roll back with answers that were rolled back are resubmitted by question manager 114.

Reduction engine 102 also adds a rule to rules 118 indicating that an answer should not be provided to that question until that particular cause of incorrectness has been accounted for, in this example, until the "else" link is added to the graph. Reduction engine 102 then "blocks" that question handler until that condition has been satisfied, at which point the question can be responded to. In this example, that condition is satisfied after the "else" link has been added to the "if". However, other questions that had been submitted to reduction engine 102, as identified in the record maintained by reduction engine 102, can still be submitted to their respective question handlers. Alternatively, additional rules may be created and added to rules 118 in other manners. For example, a rule may be specifically added by a question handler. By way of another example, a programmer could add a rule manually that applies to all programs he or she compiles. By way of yet another example, a programmer could add a rule manually that applies to a specific source program he or she is writing.

In one implementation, roll back undoes all work done since the time when the incorrect answer was supplied (e.g., in the above example, the point where the response to the question handler corresponding to the "if" node was supplied). In another implementation, roll back undoes just that work immediately affected by the incorrect response, and records that it has done so. When that work has completed again with no then-known causes for incorrectness, the new answer from that question handler 106 is compared to the old answer stored by the reduction engine 102. If they are the same, the effects of the roll back are over. Otherwise, those question handlers 106 that received an incorrect answer from this re-done question handler 106 are themselves rolled back in the same fashion. This reduces the work to be redone by the question handlers 106, at the cost of additional bookkeeping by the reduction engine.

After performing such "roll backs", reduction engine 102 can ensure that, if a question handler looks for a link and that link is ever going to be added, the question handler will be blocked until after the link is added. In doing so, reduction engine 102 avoids having to determine whether a particular question should be dispatched before or after a link is created.

There is no guarantee, however, that a question that satisfies the newly generated rule will ever be asked. For example, the order of the asking of the recorded questions may change (such as due to the "if" node's question being blocked in the above example). Thus, the question handler that adds the "else" node may never do so, resulting in a deadlock. If such a deadlock occurs, the question scheduling algorithm rolls back further (e.g., to the first question dispatched by question manager 114) to submit questions in a different order to try to avoid the deadlock.

In the illustrated example, each of the question handlers 106 submits a question to reduction engine 102 as soon as it knows that it needs the answer to the question. Thus, all question handlers 106 do not immediately begin asking questions (or even begin running) as soon as compilation begins. Rather, each question handler waits until it is asked a question that causes it, in turn, to ask a question. Additionally, a question handler 106 can call a "wait" function when it can continue processing instructions no further until it receives an answer to an outstanding question(s). The "wait" function informs reduction engine 102 that the question handler can proceed no further without an answer.

Additionally, reduction engine 102 and question handlers 106 operate based on semantic information rather than structural information regarding the graph representing the program. A node in the graph is only aware of the links that it has to other nodes and these other nodes, and not of other nodes and links in the graph. Information needed by a question handler corresponding to a node is obtained by submitting questions (via reduction engine 102) to the nodes it is linked to rather than by obtaining information regarding the overall topology and structure of the graph.

Additionally, question handlers 106 should only ask questions to obtain information that they need. Since reduction engine 102 keeps track of what questions are asked and what responses are given, asking questions for unneeded information may result in rollbacks being performed unnecessarily.

Furthermore, as in the illustrated example, nodes and links, once added to the graph, are not removed from the graph. A question handler can add nodes and/or links to the graph, but neither the question handler nor the reduction engine can delete nodes or links from the graph (except through the reduction engine performing a roll back, as discussed above).

Figure 2:
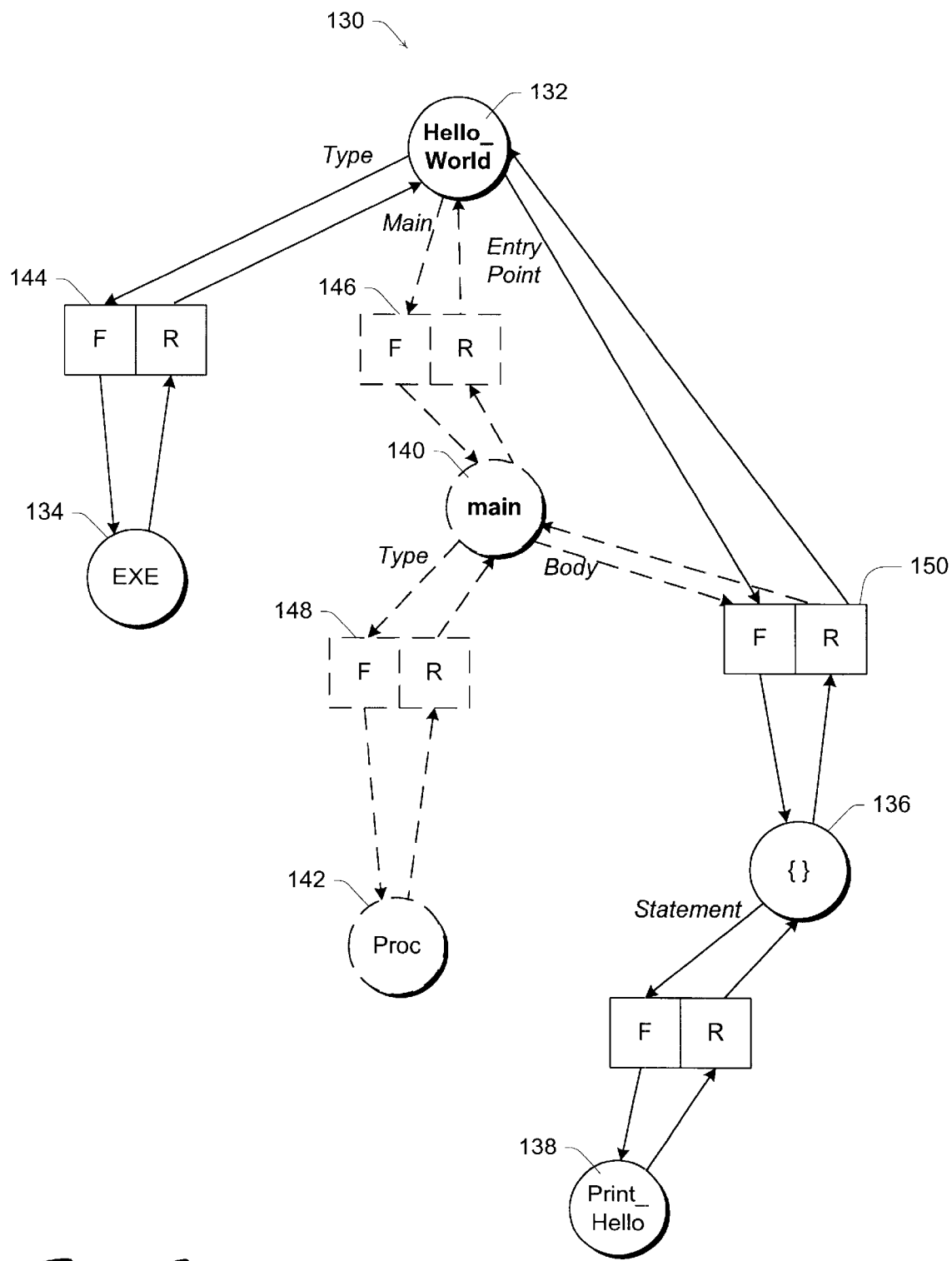
FIGS. 2 and 3 illustrate exemplary graphs representing a computer program.
Figure 3:
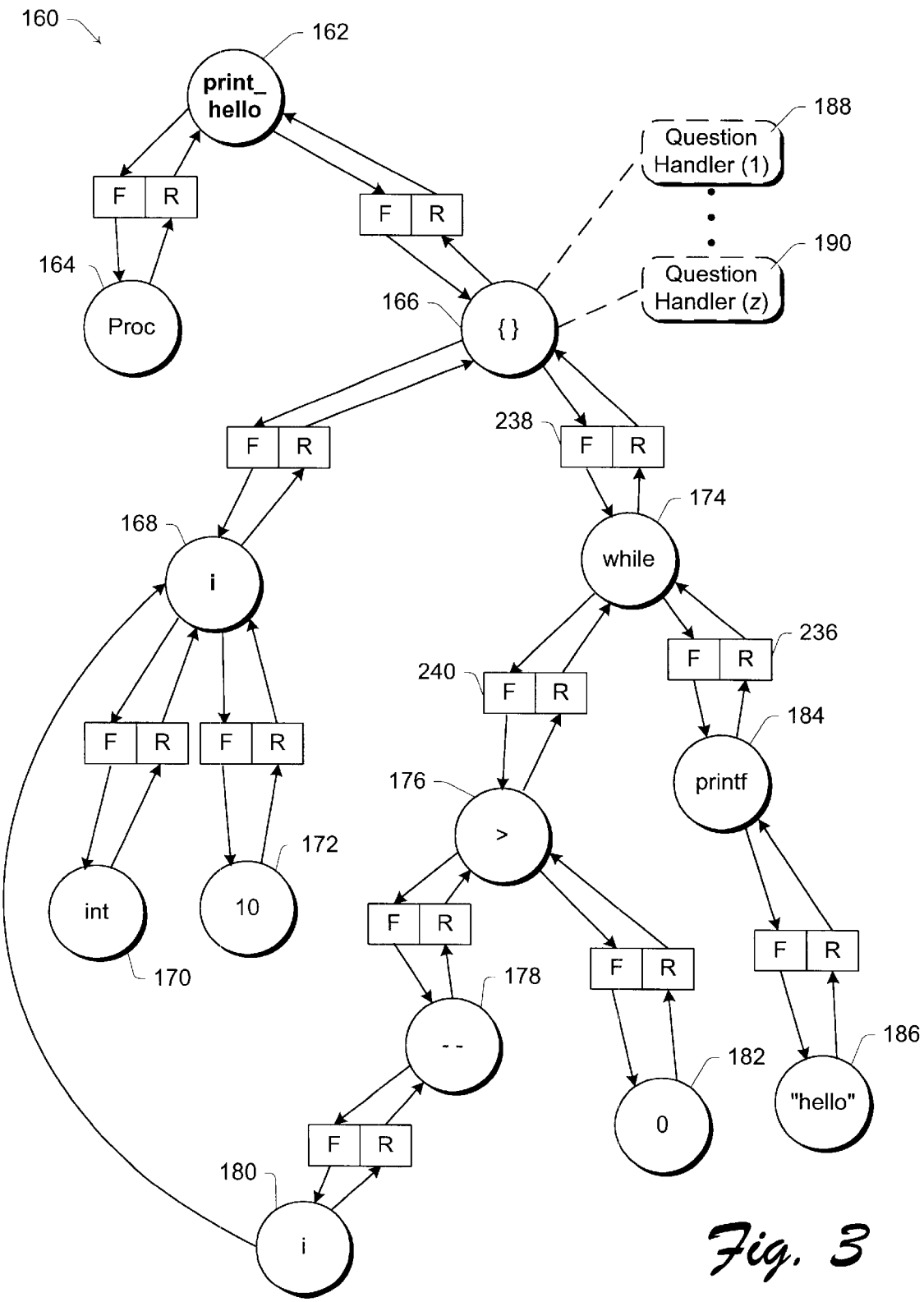

FIGS. 2–3 illustrate exemplary graphs representing a program that prints the word "hello" ten times. Each node or element in the graph is a data structure that includes an identifier of itself and identifier(s) of any nodes it is linked to. It should also be noted that, although illustrated as separate graphs, the graphs in FIGS. 2–3 (as well as FIG. 4) are all part of the same graph corresponding to the, program "Hello_World". The graphs used to represent the program can be implemented in different manners. An example of such a graph can be found in U.S. Pat. No. 5,790,863, titled "Method and System for Generating and Displaying a Computer Program", to Charles Simonyi.

The graph includes three different kinds of nodes: expression (EXPR) nodes, declaration (DCL) nodes, and link nodes. Expression and declaration nodes have the following form: (operator, properties [i], operand [i]) where there may be zero or more operands and properties. The operator field and operand fields are pointers to other nodes. An expression node represents an expression in the program. For example, an EXPR node corresponding to a "+" operator, contains a pointer (operator) to a DCL node that defines the operator and contains a pointer (operand [i]) to an EXPR node for each operand. If an operand corresponds to a leaf node of the program graph, then the EXPR node for the operand points to a DCL node that defines the operand (e.g., the definition of a particular integer variable). The operand fields can point to DCL nodes, EXPR nodes, or link nodes. In the illustrated example, a graph includes predefined DCL nodes to describe typical computational constructs (e.g., logical and arithmetic operators, constants, flow control (e.g., "for" construct), the assignment operator, and type definitions).

A declaration node represents the definition of an entity (e.g., a computational construct). The declaration node typically includes an identifier and has multiple children in which its name (e.g., "+"), the namespace in which it occurs (e.g., module), its volatility (e.g., constant or variable) and various other flags are stored as properties. In addition, DCL nodes usually have an outgoing "type" link, which points to a node(s) from which the DCL inherits much of its behavior. Thus, the children define the type and properties of the node. Because EXPR nodes point to the declaration for their operator or operand, the properties of declarations can be changed and be immediately reflected throughout the graph.

A link node represents a link among two or more other nodes (either expression or declaration nodes), and includes identifiers of (e.g., pointers to) these other nodes. In the illustrated example, each link node includes one or more unidirectional links to other node(s). Alternatively, bi-directional links could be used.

The program represented by the example graphs of FIGS. 2–3, is referred to as a "tagged" graph, in which the links of a node are precisely labeled. By way of example, an "if" node of the graph would have three operands, each corresponding to a particular labeled link (e.g., a "condition" link, a "then clause" link, and an "else clause" link). The link labels are illustrated in FIG. 2 along the link from a parent node to a link node (e.g., the label "type" along the link from node 132 to node 144). The link labels in FIG. 3 (as well as FIG. 5) have not been illustrated in order to avoid cluttering the drawings. Alternatively, non-tagged graphs, in which the links of a node are not precisely labeled, can be used with the invention, although this may lead to more rollbacks.

The graphs illustrated in FIGS. 2–3 represent source code that is to be transformed by the compiler. The graph representation of the source code can be generated in any of a wide variety of conventional methodologies. According to one such methodology, the graph is generated directly by a programmer. An example of such a methodology can be found in U.S. Pat. No. 5,790,863, titled "Method and System for Generating and Displaying a Computer Program", to Charles Simonyi. According to another such methodology computer code in a high-level programming language (e.g., C or C++) is passed through conventional lexical and syntactical analysis to generate a syntax tree which is the graphs 130 and 160 of FIGS. 2 and 3.

The program represented by the graphs in FIGS. 2–3 is the following code:

```
EXE Hello_World
    {
        print_hello();
    }
    void print_hello
    {
        int i = 10;
        while i --> 0
            printf("hello");
    }
```

The graph 130 of FIG. 2 represents the program Hello_World, and includes four nodes 132, 134, 136, and 138 linked together as illustrated. Node 132 is a declaration (DCL) node that identifies the program represented by graph 130 and is linked to additional nodes 134 and 136. Node 134 indicates the type of node 132, which is an EXE node in the illustrated example. Node 136 indicates the entry point for the program, and identifies a list of instructions for the program, each instruction being a different node linked to node 136. Node 138 identifies the single instruction (a procedure call labeled "print_hello") that is included in the exemplary program. Graph 130 also includes nodes 140 and 142. Nodes 140 and 142 are not part of the graph 130 initially; rather, they are added to the graph at a later time, as discussed in more detail below.

Each of the nodes 132–142 is linked to another node 132–142 via a link node. For example, link node 144 links together nodes 132 and 134. Each link node includes one "forward" (F) pointer that identifies a node going in one direction (e.g., "forward") through the link node (e.g., going through link node 144 in the forward direction identifies node 134), and one "reverse" (R) pointer that identifies a node in the other direction (e.g., "reverse" or "backwards") through the graph (e.g., going through link node 144 in the reverse direction identifies node 132).

The graph 160 of FIG. 3 represents the "print_hello" procedure of the program Hello_World, and includes thirteen nodes 162–186 linked together by link nodes as illustrated. Node 162 is a DCL node that identifies an entry point for the procedure "print_hello". Node 162 is linked to both node 164, which indicates the type of node 162 (a procedure), and to node 166 which identifies a list of instructions for the program. Each instruction of the print_hello procedure is linked to node 166. Node 168 represents the integer declaration instruction (int i=10), with node 170 identifying the type of node 168 (an integer) and node 172 identifying the initial value assigned to the integer variable (10). Node 174 represents the while instruction (while (i-->0) printf ("Hello");). Node 176 represents the condition, with node 178 representing an action to perform (decrementing), node 180 representing the variable to perform it on (i), and node 182 representing the value to compare to (zero). Node 184 represents the body of the while instruction, node 184 represents an instruction in the body (printf), and node 186 represents the data corresponding to the instruction identified by node 184 ("hello").

Each of the nodes 132–138 and 162–186 can have associated therewith one or more question handlers 106. A question handler 106 is a series or set of one or more instructions that is executed in order to respond to a question dispatched by reduction engine 102. This series or set of instructions can include one or more additional questions that need to be answered before a proper response can be given to reduction engine 102. In the illustrated example, each question handler is responsible for responding to only one type of question. Alternatively, a question handler may be programmed to respond to multiple types of questions.

For example, node 166 can have multiple (z) question handlers 188–190 associated with it. Question handler 188 may receive a question of "what is your intermediary language?" from reduction engine 102. In order to respond, the question handler 188 needs the intermediary language from nodes 168 and 174. Thus, the question handler 188 submits questions to reduction engine 102 for the intermediary language for nodes 168 and 174, which in turn dispatches questions to question handlers associated with nodes 168 and 174. Question handler 190 may receive a question of "are you an L-value?" from reduction engine 102, to which question handler 190 is programmed to respond "no".

A question handler for a node is programmed to answer a question that may be dispatched to it from reduction engine 102. The question handler may be programmed with the actual answer, or alternatively with a way to obtain the answer (for example, by submitting a question(s) to reduction engine 102). In the illustrated example, question handlers 106 can communicate with reduction engine 102 via an Application Programming Interface (API) (e.g., API 120 of FIG. 1). An exemplary API and its functions are described in an attached appendix that forms part of this document. Examples of questions that may be asked are listed below in Table I. It is to be appreciated that the grammar of certain "questions" can be changed to make them appear to be statements rather than questions, however, they are still treated as questions within the context of the invention.

TABLE I

Question

What is your intermediary language?
What is my enclosing control construct(s)?
Would you please change yourself to indicate that I am another overloading of you?
Are you an L-value?
Are you a constant?
What code should I run to answer this question?
Would you please change yourself to indicate you link to me?

In the illustrated example, each question handler associated with a node is responsible for responding to only one type of question. For example, if question handlers associated with a node need to be able to respond to each question in Table I, then there would be a different question handler associated with that node for each of the questions in Table I. In submitting a question to reduction engine 102, a question handler 106 provides identifiers of both the node the question is to be directed to as well as what question to ask. Reduction engine 102 uses these identifiers to dispatch a question to the appropriate question handler of the appropriate node.

The intermediary language for a program is generated using this question and answer methodology. In the illustrated implementation no question handler 106 can directly ask a question of another question handler 106. Rather, question handlers 106 receive questions only from reduction engine 102—any questions that need answered by a question handler 106 are submitted to reduction engine 102 for forwarding to the proper question handler 106.

Compiler 100 also supports a form of "transformation" in the graph representing the program. Transformation here refers to using one or more nodes in the graph to represent another node. For example, rather than having a question handler for a particular node generate the intermediary language itself, the question handler can create additional nodes linked to that particular node. Questions can then be dispatched to question handlers corresponding to these additional nodes, the responses therefrom being used by the question handler for that particular node to answer questions it has received.

A question handler 106 can include instructions to add links and/or nodes to the graph as necessary. For example, a question handler 106 may receive a question of "what is your intermediary language?". The question handler 106 responds by generating new nodes that include instructions having a closer direct correspondence to instructions in the intermediary language. The necessary information to generate the new nodes can be obtained, in combination with the programmed instructions in the question handlers 106, from the current nodes in the graph (via questions through reduction engine 102).

For example, if a question handler corresponding to node 174 of FIG. 3 receives the question "what is your intermediary language?", the question handler is programmed to recognize that the "while" instruction is not part of the intermediary language. The question handler thus submits questions to question handlers corresponding to nodes 176 and 184 to determine the information necessary to generate additional nodes. This information is then used to generate "if" and "goto" instructions that accomplish the same function as the while instruction. The "while" instruction is effectively transformed into the following code:

```
LContinue:
if(i --> 0)
    {
        printf("hello");
        goto LContinue;
    }
LBreak:
```

The question handler can add nodes and links to the graph by generating a new data structure for the node and asking questions of the new node to add links from it to other nodes. The new node is created by requesting reduction engine 102 to create the node (e.g., via API 120). The question handler can also inform another node in the graph that it is to be linked to the new node by submitting a question (via reduction engine 102) to a question handler corresponding to the other node, the question indicating that the question handler corresponding to the other node is to add an identifier to the other node that it is linked to the newly added node.

Figure 4:
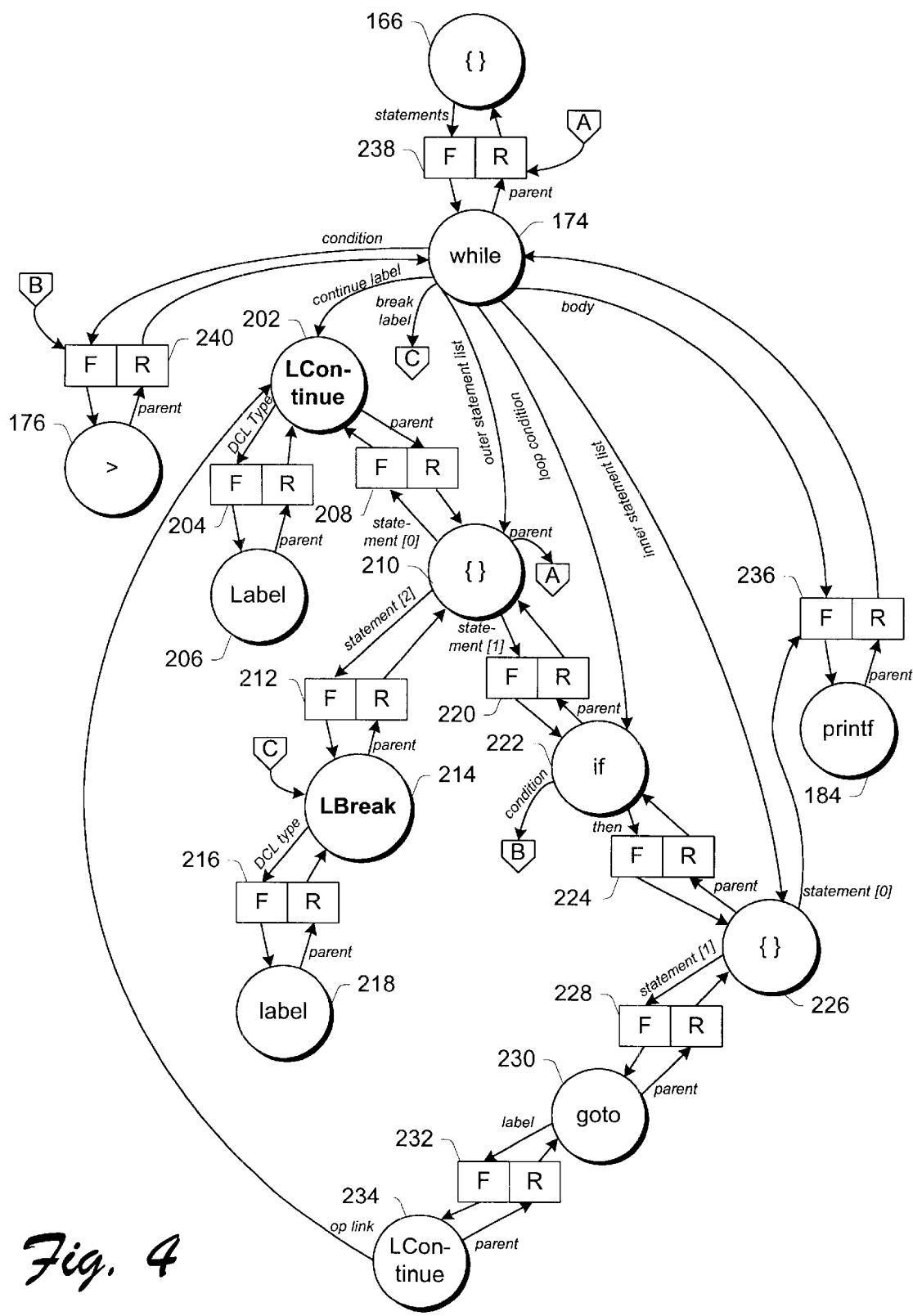
FIGS. 4 and 5 illustrate exemplary additional nodes that can be generated by a question handler.

FIG. 4 illustrates additional nodes 202–234 that are generated by the question handler in this example. A node 210 identifies the beginning of a set of instructions and is linked, via a link node 208, to a node 202 identifying the LContinue label. Node 202 is linked, via a link node 204, to a node 206 representing its type (label). The node 210 is also linked, via link node 212, to a node 214, that in turn is linked, via link node 216, to a node 218 representing the type of node 214 (label). Node 210 is also linked, via link node 220, to node 222 identifying an "if" instruction. Node 222 is further linked, via link node 224, to node 226 identifying a set of instructions. Node 226, in turn, is linked, via node 228, to node 230 identifying a "goto" instruction, which is further linked, via link node 232, to node 234 identifying a destination of the goto instruction. Node 226 is also linked, via link node 236, to node 184, which identifies the action that should occur (printf ("hello")).

Nodes 202–234 are generated by the question handler in this example. However, as illustrated in FIG. 4 they are "integrated" into the existing graph, being linked to multiple pre-existing (not generated by the question handler) nodes in the graph. For example, node 210 is linked, via pre-existing link node 238, to pre-existing nodes 166 and 174. Similarly, node 222 is linked, via pre-existing link node 240, to pre-existing node 176 of FIG. 3, which identifies the condition under which the loop is performed. Furthermore, as illustrated in FIG. 4, no nodes or links in the graph were deleted during the transformation.

Another example of an additional node being generated by a question handler is illustrated in FIG. 2. Upon receiving a "build" or "compile" command (e.g., receiving the question "what is your executable?" from a client 104), a question handler corresponding to node 132 generates a new DCL node 140 identifying a procedure "main", and a new node 142, linked to node 140, identifying the type of node 140 (a procedure), and link nodes 146 and 148. Additional links among nodes 132, 140, 142, 146, 148, and 150 are also added by the question handler, illustrated by dashed lines in FIG. 2. A link from node 140 to the list of instructions identified by node 136 is also added by the question handler. A question handler corresponding to node 140 can then query the question handlers of lower level nodes to obtain the appropriate intermediary language for "Hello_World".

The use of the graphs in FIGS. 2–4 to generate an executable program can be seen in the following example. Assume that a user enters a "build" or "compile" request, such as via a client 104 of FIG. 1. This build request is forwarded by reduction engine 102 to a question handler corresponding to node 132 of FIG. 2, which in turn generates nodes 140 and 142, as well as the link between nodes 132 and 140, the link between nodes 140 and 142, and the link between nodes 140 and 136. The question handler corresponding to node 132 then sends a question to node 140, asking for its intermediary language.

Additional questions asking for intermediary language are then propagated down the tree, with a question handler corresponding to a node submitting such a question to the node(s) it is linked to. For example, a question handler corresponding to node 136 asks a question handler corresponding to node 138 the question "what's your IL?". Similarly, the question handler corresponding to node 138 asks a question handler corresponding to node 162 of FIG. 3 "what's your IL?", the question handler corresponding to node 162 asks a question handler corresponding to node 166 "what's your IL?", and the question handler corresponding to node 166 asks a question handler corresponding to node 168 and a question handler corresponding to node 174 "what's your IL?". Upon receiving the question, the question handler corresponding to node 174 generates the additional nodes illustrated in FIG. 4.

Eventually, question handlers corresponding to the lowest level nodes in the tree (e.g., nodes 170, 172, 180, 182, and 186 of FIG. 3, and nodes 206, 218, and 230 of FIG. 4) will be able to start providing their corresponding intermediary language. This intermediary language is then passed back up through the graph as responses to the previously asked questions. The received intermediary language is then used as necessary by each question handler to generate its intermediary language and respond to the question it was asked. The exact manner in which such intermediary language is used by a question handler is dependent on the programming of the question handler (which in turn is dependent on the particular function or instruction that is intended to be carried out by that node).

Eventually, such responses work their way back up through the graph and provide a response to the initial "what's your IL?" question submitted by the question handler corresponding to node 132. The question handler corresponding to node 132 then forwards the received intermediary language to back end 110, which in turn translates the intermediary language into machine language. This machine language is then returned to the questioning client 104 (either by back end 110 directly or via reduction engine 102), giving the client 104 the executable code it requested.

Many additional questions may also be asked by the question handlers corresponding to the nodes in FIGS. 2–4. These questions are those that are necessary for the question handler to fuilly answer the question provided to it. For example, in addition to obtaining the intermediary language for a linked to node, additional information such as the type of node it is, whether it is an L-value, whether it is a constant, etc. may be necessary for the question handler to ask.

With the architecture illustrated in FIG. 1, the compiler 100 is easily extensible by various users, whether they be part of the original design team of the compiler or a subsequent user. Such a user can add functionality, such as particular high-level language instructions that he or she wishes to have supported by compiler 100, by adding in the appropriate code that is to be used as the question handlers corresponding to the additional node. As discussed above, an initialization program 111 assigns the appropriate question handlers to the appropriate nodes of the graph. By writing new question handlers to be included in the initialization program 111 and associated with nodes by the initialization program 111, the appropriate question handlers for the new code are made available during compilation. The code written in the question handlers can add additional links and nodes as necessary to obtain the intermediary language for the new instruction. Since no node or links will be deleted, the adding of additional links and nodes can be done without adversely affecting the other nodes and links in the graph.

The following example illustrates the extension of compiler 100. Assume that a particular designer desires to add to compiler 100 a new instruction called Σ having the following format:

Σ expr1 [, expr 2, expr 3 . . . ]

where Σ takes one or more expressions as its operands and evaluates to the sum of these operands. Assuming a binary+ operator is available in the intermediary language, or a binary+ has been implemented using other primitives in the intermediary language, the user can use this operator to implement the Σ instruction.

Figure 5:
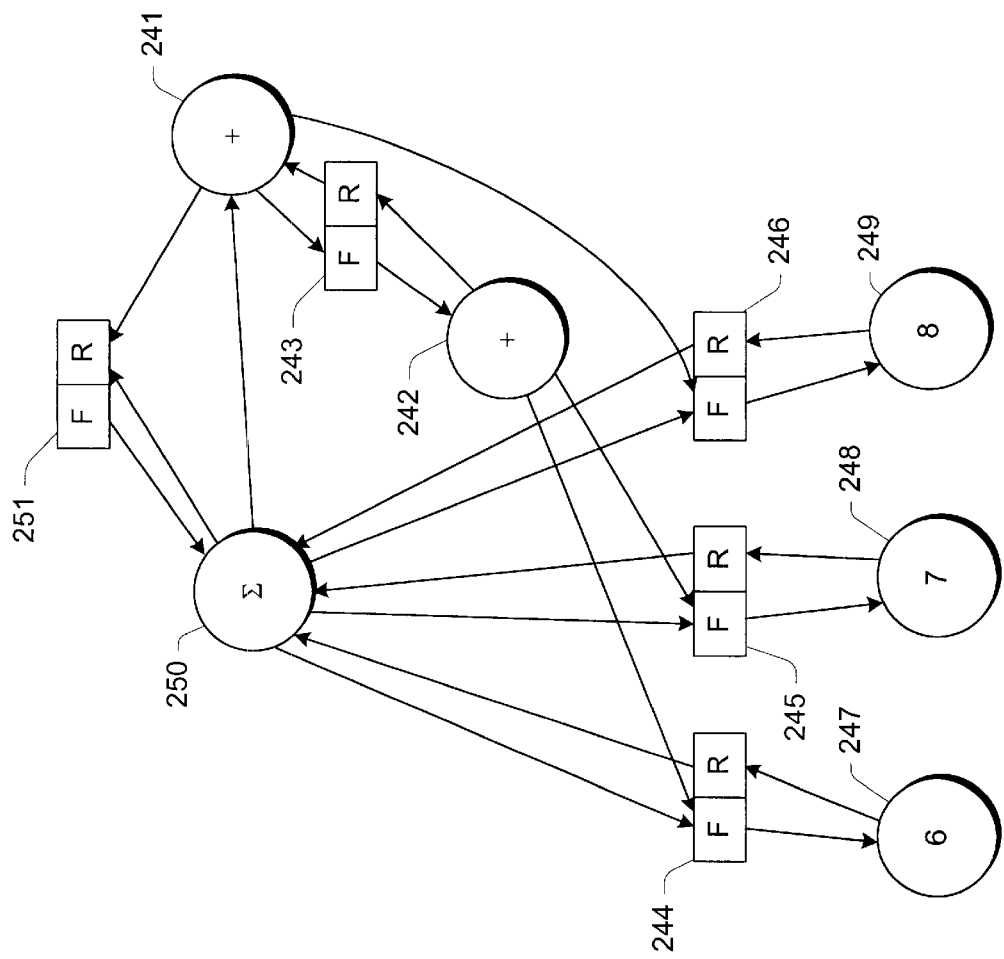

In order to support this new instruction, the user can include a question handler, to be associated with any Σ node, that responds to the question "what is your intermediary language?" by generating new nodes and links that carry out the functionality of the Σ instruction using the binary+ operator. FIG. 5 illustrates an example graph of new nodes and links that can be generated by the question handler for the following instruction:

Σ 6, 7, 8

This expression is equivalent to the expression "(6+7)+8" so, as FIG. 5 illustrates, two new+nodes 241 and 242 are created. One+node 242 is linked as an operator of the other 241 via a new link 243, and the two+nodes 241 and 242 share the three links 244, 245, and 246 to the three operands 247, 248, and 249 of Σ node 250. The nodes 241–250 are linked to other nodes in the graph, such as via link node 251. Note that the number of + nodes created is dependent on the number of operands of the original Σ. This number, and the manner in which the created nodes are linked together, are determined by the instructions in the question handler for "what is your intermediary language?" associated with the Σ node 250.

Additionally, in one implementation of the invention, a question handler associated with one node can "influence" a question handler associated with another node by adding an "override" tag to the other node. The override tag is a tag in the node's data structure that can be set to indicate that additional code in the form of an additional question handler corresponds to the node and that it is to be executed to respond to a particular question from reduction engine 102. If the particular question is received from reduction engine 102, then the question handler on the node recognizes that the override tag has been set and calls the override handler to handle the questions rather than handling the question itself. In situations where multiple overrides are added to a node, one override handler may declare that it is aware of the other and assume responsibility for handling the code of the other override handler as well. If neither override is aware of the other, the reduction engine cannot know which one is correct and so it will report an error.

Figure 6:
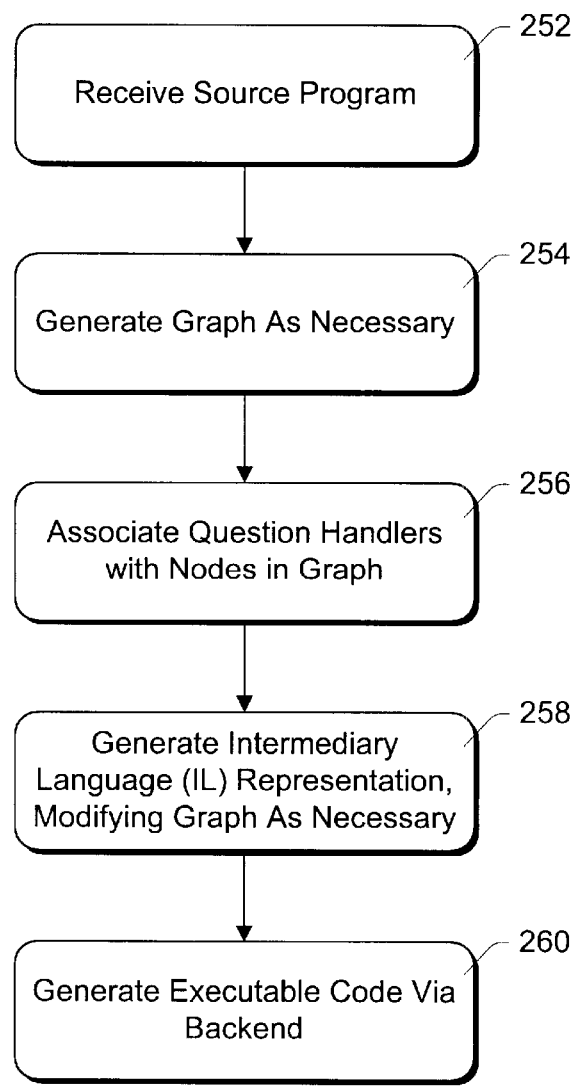
FIG. 6 is a flowchart illustrating exemplary steps in generating executable code by transforming a program using the extensible compiler in accordance with one implementation of the invention.

FIG. 6 is a flowchart illustrating exemplary steps in generating executable code by transforming a program using the extensible compiler in accordance with one implementation of the invention. The steps of FIG. 6 are implemented by compiler 100 of FIG. 1, and may be performed in software. FIG. 6 is described with additional reference to components in FIG. 1.

The source program is received or otherwise made available to compiler 100 (step 252). The graph representing the program is generated as necessary (step 254), and question handlers are associated with the appropriate nodes (step 256). Eventually, a command is received by reduction engine 102 from a client 104 for executable code. In response to the command, reduction engine 102 transforms at least a portion of the program (depending on the nature of the command received) in graph form to the intermediary language. This transformation is carried out via multiple questions, adding to the graph as necessary (step 258). Eventually, the questions and answers lead to a block of intermediary language code that can be understood by the back end 110 (FIG. 1). The block of intermediary language code is provided to the back end to generate executable code (step 260).

Inheritance

Each of the question handlers 106 of FIG. 1 is programmed with instructions to execute or run in order to respond to questions received from reduction engine 102. Each individual question handler 106 can be programmed with the specific code to run, as discussed above. Alternatively, one or more question handlers 106 may "inherit" code (e.g. a set or series of instructions) to run from another question handler.

Such inheritance is accomplished by having associated with a node a "default handler" that takes the place of one or more question handlers corresponding to the node. The default handler is a question handler that submits a question to a question handler of another node asking for code to execute in order to respond to the question. This process can continue through question handlers of multiple other nodes with each of these other question handlers asking another question handler for code that it can execute in order to respond to the question that was submitted to it. Eventually, this process results in code for the original question handler to execute.

Figure 7:
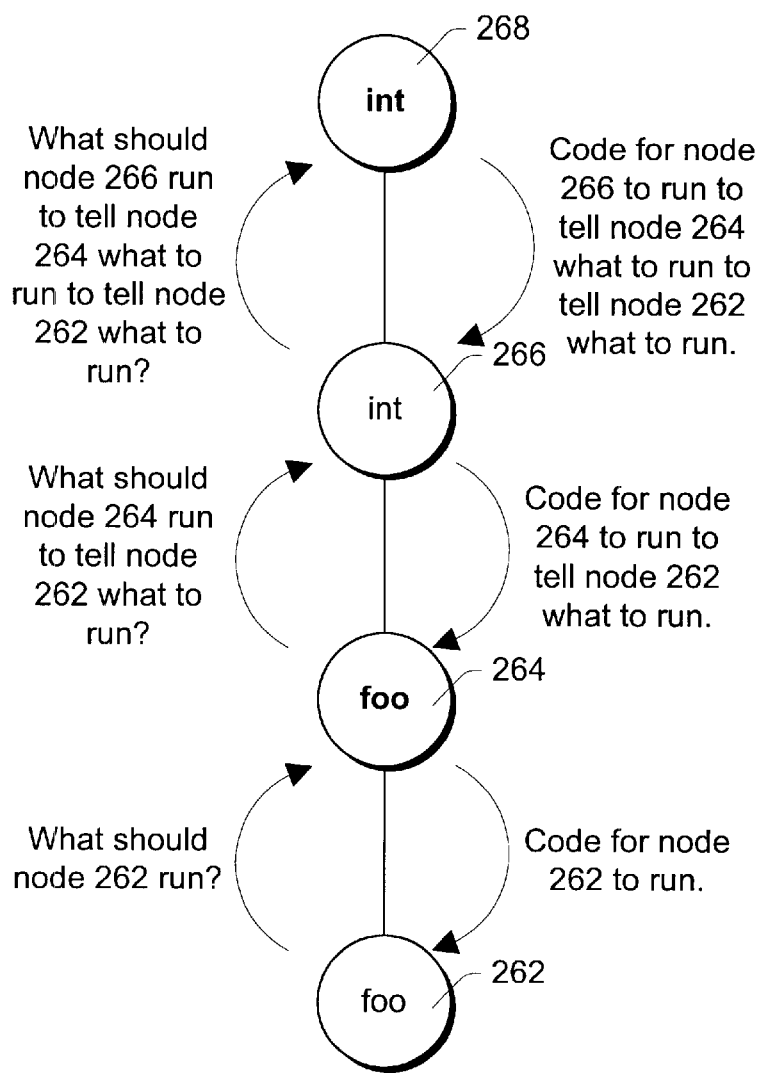
FIG. 7 provides an example of inheritance in accordance with one implementation of the invention.

FIG. 7 provides an example of inheritance in accordance with one implementation of the invention. Each node includes an "op" tag that identifies, directly or indirectly, a declaration node in the graph representing all declarations. This node has a question handler for the "what code should I run?" question which tells the asking declaration to forward the question to its type. In the example of FIG. 7, node 262 asks DCL node 264 the question "what code should I run?". The response is code that is to be executed by the default handler corresponding to node 262. Node 264 answers this question by asking a similar question of node 266, its "type" node, as instructed by the master declaration node. Node 266 answers this question in turn by asking a similar question of DCL node 268, which is the declaration for the "int" abstraction. It is here that an actual question handler (corresponding to node 268) will have been registered, and this handler will return code to node 266 to return code to node 264 to return code to node 262 to answer the question that was asked of it.

In the illustrated example, the default handler includes instructions that cause it, upon receipt of a question, to ask another question of the question handler associated with the node identified by the "op" tag, this other question being "what code should I run to answer this question". Eventually the default handler receives code as a response to its question, and executes the received code. By standardizing the default handler in such a manner, the same default handler can be used for any question on any node—the question that it needs to respond to was identified when it received the question, and the node that the default handler is to submit its question to is identified by the "op" tag.

Additionally, some of the question handlers that respond to default handlers with code to execute support "wildcards". The question handler includes the necessary instructions to execute for any of a family of questions that the question handler may be asked, rather than including code to respond to only a particular question. By being able to respond to an entire family of questions, the question handler is able to respond to the question "what code should I run to answer this question" without regard for what "this question" is.

As discussed above, new question handlers can be registered with the reduction engine, allowing the compiler to be extended. The registering of new question handlers, and thus new questions, is accomplished by submitting additional questions to the reduction engine. When a question is submitted by a question handler to add a new question, a modifier is included as part of the question that identifies the relationship between the generic question (e.g., "what could should I run") and the specific question to which it relates (e.g., "what is your type?"). For example, to add a new question of "what could should I run to answer the question 'what is your type?'?", an API call is made to the reduction engine in the form of "I would like to register another question which has a 'what could should I run to answer a question' relationship with the 'what is your type?' question?". By generating such a relationship, the default handler knows what question to submit to the reduction engine when it wants to ask "what could should I run to answer the question 'what is your type?'?".

By using inheritance, the particular code that a question handler should run is obtained from a declaration node corresponding to the node. Multiple nodes within the graph can similarly obtain that same code from the declaration node, thereby alleviating the need for that code to be written into a handler for each such node. Rather, only the default handler need be included. By way of example, multiple "int" nodes can include a default handler that accesses declaration node 266 (either directly, via node 264, or via some other node(s)), asking "what code should I run to respond to 'what is your intermediary language?'?"

Furthermore, the response from declaration node 266 can be cached by reduction engine 102, so subsequent questions can be immediately answered by reduction engine 102 without requiring dispatch of the question to a question handler associated with declaration node 266.

In the illustrated example, each node in the graph is not more than a threshold number of "uplinks" away from a declaration node from which code can be inherited. According to one implementation, this threshold number of uplinks is two. Alternatively, different threshold numbers could be used.

Additionally, in the illustrated example, default handlers are question-specific. In other words, each question that can be asked has a corresponding default handler. Alternatively, multiple questions may be handled by a single question handler, with the default handler obtaining code from the question handler corresponding to the declaration node for each of these multiple questions.

Exemplary Computer Environment

FIG. 8 shows a general example of a computer that can be used to run compiler 100 of FIG. 1. The compiler 100, clients 104, and question handlers 106 of FIG. 1 can be stored, at different times, in any of the various memories and storage devices of computer 300 illustrated in FIG. 8.

Computer 300 includes one or more processors or processing units 302, a system memory 304, and a system bus 306 that couples various system components including the system memory 304 to processors 302. The system bus 306 may be any of several types of bus structures including a memory bus or memory controller, a peripheral bus, and a local bus using any of a variety of bus architectures. The system memory includes read only memory (ROM) 308 and random access memory (RAM) 310. A basic input/output system (BIOS) 312, containing the basic routines that help to transfer information between elements within computer 300, such as during start-up, is stored in ROM 308.

Computer 300 further includes a hard disk drive 314 for reading from and writing to a hard disk, not shown, a magnetic disk drive 316 for reading from and writing to a removable magnetic disk 318, and an optical disk drive 320 for reading from or writing to a removable optical disk 322 such as a CD ROM or other optical media. The hard disk drive 314, magnetic disk drive 316, and optical disk drive 320 are connected to the system bus 306 by an SCSI interface 324 or some other appropriate interface. The drives and their associated computer-readable media provide nonvolatile storage of computer readable instructions, data structures, program modules and other data for computer 300. Although the exemplary environment described herein employs a hard disk, a removable magnetic disk 318 and a removable optical disk 322, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 318, optical disk 322, ROM 308, or RAM 310, including an operating system 328, one or more application programs 330, other program modules 332, and program data 334. A user may enter commands and information into computer 300 through input devices such as keyboard 336 and pointing device 338. Other input devices (not shown) may include a microphone, joystick, game pad, satellite dish, scanner, or the like. These and other input devices are connected to the processing unit 302 through an interface 340 that is coupled to the system bus. A monitor 342 or other type of display device is also connected to the system bus 306 via an interface, such as a video adapter 344. In addition to the monitor, personal computers typically include other peripheral output devices (not shown) such as speakers and printers.

Computer 300 operates in a networked environment using logical connections to one or more remote computers, such as a remote computer 346. The remote computer 346 may be another personal computer, a server, a router, a network PC, a peer device or other common network node, and typically includes many or all of the elements described above relative to computer 300, although only a memory storage device 348 has been illustrated in FIG. 8. The logical connections depicted in FIG. 8 include a local area network (LAN) 350 and a wide area network (WAN) 352. Such networking environments are commonplace in offices, enterprise-wide computer networks, intranets, and the Internet. In the described embodiment of the invention, remote computer 346 executes an Internet Web browser program such as the "Internet Explorer" Web browser manufactured and distributed by Microsoft Corporation of Redmond, Wash.

When used in a LAN networking environment, computer 300 is connected to the local network 350 through a network interface or adapter 354. When used in a WAN networking environment, computer 300 typically includes a modem 356 or other means for establishing communications over the wide area network 352, such as the Internet. The modem 356, which may be internal or external, is connected to the system bus 306 via a serial port interface 326. In a networked environment, program modules depicted relative to the personal computer 300, or portions thereof, may be stored in the remote memory storage device. It will be appreciated that the network connections shown are exemplary and other means of establishing a communications link between the computers may be used.

Generally, the data processors of computer 300 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Conclusion

The invention provides for a transformational programming system in which code can be inherited. The transformational programming system includes a reduction engine that communicates with multiple question handlers corresponding to nodes of a graph representing the program being compiled. Communication between the reduction engine and the question handlers is carried out using a question and answer methodology. A question handler can advantageously obtain the code it should execute in order to respond to a particular question by submitting a question to another node in the graph. This other node (or alternatively the reduction engine or perhaps yet another node) provides a set of instructions that the particular node should use to respond to the particular question.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. At least one computer-readable media having stored thereon a computer program that, when executed by at least one processor, causes the at least one processor to perform functions to transform a program represented as a graph having a plurality of nodes into a desired output, the functions including:

submitting, via a reduction engine, a first question to a first question handler of a plurality of question handlers for a node of the graph corresponding to the first question handler requesting a desired output from the node;

submitting, by the first question handler and in response to the first question, a second question to a second question handler via the reduction engine requesting information on how to handle the first question;

providing, by the second question handler and in response to the second question, information to the first question handler via the reduction engine on how to handle the first question; and obtaining, by the first question handler, the desired output by handling the first question as indicated by the information.

2. At least one computer-readable media as recited in claim 1, wherein the desired output comprises an intermediary language for the node.

3. At least one computer-readable media as recited in claim 1, further comprising responding, by the first question handler, to a source of the first question via the reduction engine.

4. At least one computer-readable media as recited in claim 1, wherein the functions further include:

receiving a request for the desired output from a client; and submitting the first question to the first question handler based at least in part on the request from the client.

5. At least one computer-readable media as recited in claim 1, wherein the desired output comprises the transformation of the first node into C++.

6. At least one computer-readable media as recited in claim 1, wherein the submitting the second question comprises submitting the second question to the second question handler which corresponds to another node of the graph.

7. At least one computer-readable media as recited in claim 1, wherein the information comprises a set of instructions to be executed by the first question handler.

8. At least one computer-readable media as recited in claim 1, the functions further including:

submitting, by the second question handler and in response to the second question, a third question to a third question handler via the reduction engine requesting information on how to handle the second question; and providing, by the third question handler and in response to the third question, information to the second question handler via the reduction engine on how to handle the second question.

9. A method comprising:

associating one or more question handlers with each of a plurality of nodes of a graph representing a program, the plurality of nodes being interconnected via a plurality of links;

inheriting, by a subset of a plurality of question handlers, information regarding how to respond to questions from another subset of the plurality of question handlers; and transforming the program into another language by submitting a plurality of questions to the plurality of question handlers corresponding to the plurality of nodes.

10. A method as recited in 9, wherein the information comprises, for each question handler in the subset, a series of instructions to be executed by the question handler.

11. A method as recited in 9, wherein the inheriting comprises, for each question handler in the subset, submitting a question requesting the information.

12. A method as recited in 11, further comprising, for each question requesting the information, responding to the question by one of the question handlers from the other subset.

13. At least one computer-readable memory containing a computer program that is executable by a processor to perform the method recited in claim 9.

14. A method as recited in claim 9, wherein the inheriting further comprises inheriting, by the other subset of the plurality of question handlers from yet another subset of the plurality of question handlers, information regarding how the subset of the plurality of question handlers is to respond to questions.

15. A method comprising:

associating one or more question handlers with each of a plurality of nodes of a graph representing a program, the plurality of nodes being interconnected via a plurality of links;

inheriting, by a subset of a plurality of question handlers, information regarding how to respond to questions from another subset of the plurality of question handlers, wherein the information comprises, for each question handler in the subset, a series of instructions to be executed by the question handler, wherein the series of instructions includes additional questions to be submitted to selected ones of the plurality of question handlers; and transforming the program into another language by submitting a plurality of questions to the plurality of question handlers corresponding to the plurality of nodes.

16. A system comprising:

a plurality of question handlers, including a first subset of question handlers and a second subset of question handlers, wherein each of the plurality of question handlers is associated with a node of a graph representing a program;

a reduction engine to communicate questions and responses among the plurality of question handlers;

wherein the first subset of question handlers is programmed to submit, via the reduction engine, questions to the second subset of question handlers, the questions querying how the first subset should respond to other questions received by the first subset; and wherein the second subset of question handlers is programmed to submit to the first subset, via the reduction engine, information identifying how the first subset should respond to the other questions.

17. A system as recited in 16, wherein the information comprises a set of instructions to be executed by the first subset.

18. A system as recited in 16, wherein the reduction engine is to maintain a record of the information submitted by the second subset of question handlers and respond to a subsequent question querying how a question handler of the first subset should respond to a question without submitting the question to the second subset.

19. A system as recited in 16, wherein the system comprises a compiler.

20. A method in a question handler corresponding to a node of a graph representing a program, the method comprising:

receiving a question;

submitting, in response to the question, another question requesting a set of instructions to execute in order to respond to the question; and receiving the set of instructions in response to the other question, wherein the set of instructions includes at least one additional question to be submitted to another question handler.

21. A method as recited in 20, further comprising:

executing the set of instructions; and providing a response to the question based at least in part on the executed set of instructions.

22. A method as recited in 20, wherein:

the receiving the question comprises receiving the question from a reduction engine;

the submitting comprises submitting the other question to the reduction engine; and the receiving the set of instructions comprises receiving the set of instructions from the reduction engine.

23. A method as recited in 22, wherein the receiving the set of instructions from the reduction engine comprises receiving the set of instructions from a question handler corresponding to another node via the reduction engine.

24. A method as recited in 20, further comprising repeating the submitting and the receiving a set of instructions for a plurality of received questions.

25. A method as recited in 20, wherein the receiving the set of instructions comprises receiving the set of instructions from a question handler corresponding to another node.

26. At least one computer-readable memory containing a computer program that is executable by a processor to perform the method recited in claim 20.

27. A method for transforming a program represented as a graph having a plurality of nodes into another language, the method comprising:

receiving a question from a first of a plurality of question handlers, the question requesting information regarding how the first question handler should respond to another question, and each of the plurality of question handlers corresponding to a different one of the plurality of nodes;

dispatching the question to a second of the plurality of question handlers;

receiving a response from the second question handler indicating how the first question handler should respond to the other question; and providing the response to the first question handler.

28. A method as recited in 27, further comprising receiving additional questions from the first question handler based at least in part on the information.

29. A method as recited in 27, wherein the first question handler is associated with a node of the graph and the second question handler is associated with another node of the graph.

30. A method as recited in 27, wherein the method is implemented in a compiler.

31. At least one computer-readable memory containing a computer program that is executable by a processor to perform the method recited in claim 27.

32. A method as recited in claim 27, wherein the response comprises a set of instructions to be executed by the first question handler.

33. A method for transforming a program represented as a graph into another language, the method comprising:

receiving a question from a first of a plurality of question handlers, the question requesting information regarding how the first question handler should respond to another question;

dispatching the question to a second of the plurality of question handlers;

receiving a response from the second question handler indicating how the first question handler should respond to the other question;

providing the response to the first question handler;

receiving an additional question from the second question handler, the additional question requesting information regarding how the second question handler should respond to the question from the first question handler;

dispatching the additional question to a third of the plurality of question handlers;

receiving an additional response from the third question handler indicating how the second question handler should respond to the first question handler; and providing the additional response to the second question handler.

34. A method for transforming a program represented as a graph into another language, the method comprising:

receiving a question from a first of a plurality of question handlers, the question requesting information regarding how the first question handler should respond to another question;

dispatching the question to a second of the plurality of question handlers;

receiving a response from the second question handler indicating how the first question handler should respond to the other question;

providing the response to the first question handler;

storing the response from the second question handler;

receiving an additional question from a third of the plurality of question handlers, the additional question requesting information regarding how the third question handler should respond to the other question; and providing the stored response to the third question handler.

35. A system comprising:

a memory to store a plurality of instructions; and a processor, coupled to the memory, to execute the plurality of instructions to implement a reduction engine and a plurality of question handlers, wherein, the reduction engine submits a question to a first of the plurality of question handlers, the first question handler, in response to the question, submits to the reduction engine another question to a second of the plurality of question handlers querying how the first question handler should respond to the question, the reduction engine obtains a response to the other question, the response including information identifying how the first question handler should respond to the question, wherein the information comprises a set of instructions to be executed by the first question handler, the reduction engine provides the response to the first question handler, and the first question handler operates in accordance with the information.

36. A system as recited in 35, wherein the set of instructions includes additional questions to be submitted to the reduction engine.

37. A system as recited in claim 35, wherein the first question handler operates in accordance with the information to respond to the question submitted by the reduction engine.

38. A system as recited in claim 35, wherein:

the reduction engine obtains the response by submitting the other question to the second question handler; and the second question handler receives the other question from the reduction engine and responds to the reduction engine with the information.

39. A system as recited in claim 35, wherein the reduction engine obtains the response by accessing a record of responses and retrieving the response from the record of responses.

40. At least one computer-readable media having stored thereon a plurality of instructions that, when executed by at least one processor, causes the at least one processor to:

associate one or more question handlers with each of a plurality of nodes of a graph representing a program, the plurality of nodes being interconnected via a plurality of links;

inherit, by a subset of a plurality of question handlers, information regarding how to respond to questions from another subset of the plurality of question handlers, wherein the information includes additional questions to be submitted to selected ones of the plurality of question handlers; and transform the program into another language by submitting a plurality of questions to the plurality of question handlers corresponding to the plurality of nodes.

* * * * *

UNITED STATES PATENT AND TRADEMARK OFFICE
CERTIFICATE OF CORRECTION

PATENT NO. : 6,493,869 B1
DATED : December 10, 2002
INVENTOR(S) : Kwiatkowski et al.

It is certified that error appears in the above-identified patent and that said Letters Patent is hereby corrected as shown below:

<u>Column 13,</u>
Line 12, replace "fuilly" with -- fully --.

Signed and Sealed this

Seventeenth Day of June, 2003

JAMES E. ROGAN
*Director of the United States Patent and Trademark Office*